(12) United States Patent
Abevi et al.

(10) Patent No.: US 10,823,275 B2
(45) Date of Patent: Nov. 3, 2020

(54) ROLLER SCREW MECHANISM WITH MAGNETIZED MEANS

(71) Applicant: Aktiebolaget SKF, Gothenburg (SE)

(72) Inventors: Folly Abevi, Chambéry (FR); Christian Boch, Chambery (FR); Georges Claret, La Motte-Servolex (FR); Bernard Guetaz, Le Bourget du Lac (FR)

(73) Assignee: Aktiebolaget SKF, Gothenburg (SE)

( * ) Notice: Subject to any disclaimer, the term of this patent is extended or adjusted under 35 U.S.C. 154(b) by 339 days.

(21) Appl. No.: 15/757,594

(22) PCT Filed: Sep. 11, 2015

(86) PCT No.: PCT/EP2015/070840
§ 371 (c)(1),
(2) Date: Mar. 5, 2018

(87) PCT Pub. No.: WO2017/041854
PCT Pub. Date: Mar. 16, 2017

(65) Prior Publication Data
US 2019/0024777 A1  Jan. 24, 2019

(51) Int. Cl.
| F16H 25/00 | (2006.01) |
| F16H 57/04 | (2010.01) |
| F16H 25/22 | (2006.01) |
| B03C 1/033 | (2006.01) |
| B03C 1/28 | (2006.01) |
| B03C 1/30 | (2006.01) |

(52) U.S. Cl.
CPC ....... *F16H 57/0402* (2013.01); *B03C 1/0332* (2013.01); *B03C 1/286* (2013.01); *B03C 1/30* (2013.01); *F16H 25/2252* (2013.01); *B03C 2201/18* (2013.01); *F16H 2025/2257* (2013.01)

(58) Field of Classification Search
CPC ............ F16H 57/0402; F16H 25/2252; F16H 2025/2257; B03C 1/30; B03C 1/286; B03C 1/0332; B03C 2201/18
See application file for complete search history.

(56) References Cited

U.S. PATENT DOCUMENTS

| 5,557,154 A * | 9/1996 | Erhart | F04B 7/00 310/68 B |
| 8,701,834 B2 * | 4/2014 | Jacob | F16H 57/0401 184/6.12 |
| 9,568,077 B2 * | 2/2017 | Jacob | F16H 57/0401 |
| 2012/0042741 A1 * | 2/2012 | Jacob | F16H 57/0464 74/89.44 |

(Continued)

FOREIGN PATENT DOCUMENTS

| DE | 102014102108 B3 | 5/2015 |
| JP | 2001090799 A | 4/2001 |

(Continued)

*Primary Examiner* — Victor L MacArthur
(74) *Attorney, Agent, or Firm* — Laurence A. Greenberg; Werner H. Stemer; Ralph E. Locher (57) ABSTRACT

The roller screw mechanism provides a screw having an outer thread, a nut surrounding and coaxial with the screw, the nut including an inner thread, and a plurality of rollers radially disposed between the screw and the nut and cooperating with the outer and inner threads. Magnets for attracting metal particles are disposed inside the roller screw mechanism.

10 Claims, 5 Drawing Sheets

(56) References Cited

U.S. PATENT DOCUMENTS

| | | |
|---|---|---|
| 2013/0220728 A1 | 8/2013 | Lee |
| 2015/0007677 A1* | 1/2015 | Jacob .................. F16H 57/0401 74/89.44 |
| 2015/0233456 A1 | 8/2015 | Magnin et al. |

FOREIGN PATENT DOCUMENTS

| | | |
|---|---|---|
| JP | 2007162721 A | 6/2007 |
| JP | 2009121562 A | 6/2009 |

\* cited by examiner

ROLLER SCREW MECHANISM WITH MAGNETIZED MEANS

CROSS REFERENCE

This is a United States National Stage Application claiming the benefit of International Application Number PCT/EP2015/070840 filed on Sep. 11, 2015, of which is incorporated herein by reference in its entirety.

TECHNOLOGICAL FIELD

The present invention relates to the field of roller screw mechanisms for transforming a rotary movement into a linear translation movement, and vice versa.

BACKGROUND

Such a mechanism is provided with a screw having an outer thread, with a nut arranged around the screw and having an inner thread, and with a plurality of longitudinal rollers engaging the outer and inner threads of the screw and of the nut.

In a first type of roller screw mechanism, the rollers each have an outer thread engaging the outer and inner threads of the screw and of the nut. The outer thread of each roller is extended axially at each end by gear teeth themselves extended axially by a cylindrical stud or pivot extending outwards. The threads of the rollers and the thread of the nut have helix angles that are identical to each other and different to that of the thread of the screw such that, when the screw rotates in relation to the nut, the rollers rotate on themselves and roll about the screw without moving axially inside the nut. The rollers are rotationally guided by gear wheels mounted in a non-threaded part of the nut and having inner gear teeth meshing with the gear teeth of said rollers. The roller screw mechanism further comprises two end spacer rings each mounted radially between the screw and the associated gear wheel. Each spacer ring includes a plurality of axial through-holes inside which the studs of the rollers are housed. The spacer rings enable the rollers to be carried and the regular circumferential spacing thereof to be kept. Such mechanism is called a planetary roller screw.

A second type of roller screw mechanism has a similar operating principle but is different as a result of an inverted arrangement. The helix angles of the threads of the rollers, of the screw and of the nut are selected such that, when the screw rotates in relation to the nut, the rollers rotate on themselves about the screw and move axially in the nut. The rollers are rotationally guided by outer gear teeth provided on the screw and meshing with the gear teeth of the rollers. Two spacer rings are also provided to ensure the even circumferential position of the rollers. Such mechanism is called an inverted roller screw.

A third type of roller screw mechanism comprises a plurality of rollers each provided with outer grooves instead of outer threads. During a rotation of the screw or the nut, the rollers move axially in the nut. After a complete revolution, each roller is returned to the initial position thereof by cams which are fixed to the ends of the nut. Such a mechanism is called a recirculation roller screw.

Generally, during the operation of the roller screw mechanism, metal particles are generated which leads to contamination of the lubricant introduced into said mechanism. Accordingly, the optimum lubrication effect is not retained which reduces maintenance intervals.

One aim of the present invention is to overcome these drawbacks.

SUMMARY

In one embodiment, the roller screw mechanism comprises a screw provided with an outer thread, a nut surrounding and coaxial with said screw, said nut being provided with an inner thread, and a plurality of rollers radially disposed between the screw and the nut and cooperating with said outer and inner threads. Magnetized means for attracting metal particles are disposed inside said roller screw mechanism.

The magnetized means provided within the mechanism radially between the screw and the nut enable to catch metallic particles generated during the operation of the mechanism, for example during the running-in phase. Metallic particles are caught and trapped by the magnetic means instead of being spread and mixed with the lubricant introduced into the mechanism. The lubricant may be grease or oil. This improves lubricant cleanliness and extends maintenance intervals. This also increases the service life of the mechanism.

In one embodiment, the rollers are each provided with an outer thread engaging said outer and inner threads and with two outer gear teeth. The mechanism further comprises two synchronization gear teeth provided on the nut, or the screw, and meshing with said gear teeth of the rollers.

Preferably, said magnetized means are disposed adjacent to at least one of the synchronization gear teeth.

In a first case, said magnetized means are connected to the nut and located axially between the inner thread of said nut and one of the synchronization gear teeth. Said magnetized means may be secured to the nut, or to at least one of gear wheels of said mechanism which are provided with the synchronization gear teeth.

In a second case, said magnetized means are secured to the outer surface of the screw and located axially between the outer thread of said screw and one of the synchronization gear teeth.

Advantageously, the mechanism comprises at least two magnetized means disposed adjacent to the associated synchronization gear teeth.

In another embodiment, the rollers are each provided with outer grooves engaging said outer and inner threads, the mechanism further comprising one retaining cage comprising a plurality of pockets spaced apart one with another in the circumferential direction and inside which are disposed the rollers. Said magnetized means may be secured to the retaining cage and/or may be disposed at least on one of wipers mounted into a bore of the nut.

BRIEF DESCRIPTION OF THE DRAWINGS

The present invention and its advantages will be better understood by studying the detailed description of specific embodiments given by way of non-limiting examples and illustrated by the appended drawings on which.

DETAILED DESCRIPTION

Figure 1:
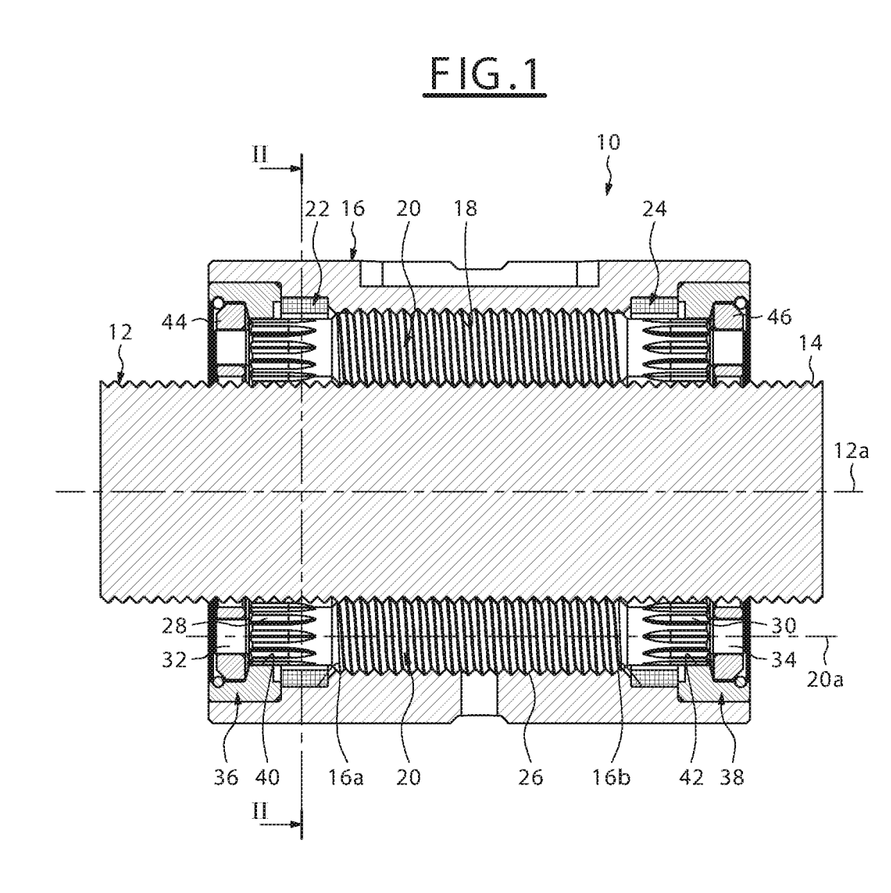
FIG. 1 is a cross-section of a roller screw mechanism according to a first example of the invention.

As shown on FIG. 1, a planetary roller screw mechanism 10 comprises a screw 12, with an axis 12a, provided with an outer thread 14, a nut 16 mounted coaxially about the screw 12 and provided with an inner thread 18, the internal diameter of which is greater than the external diameter of the outer thread 14, and a plurality of longitudinal rollers 20 arranged radially between the screw 12 and the nut 16. The screw 12 extends longitudinally through a cylindrical bore of the nut 16 on which the inner thread 18 is formed. As will be described later, the mechanism 10 further comprises two permanent magnetized magnets 22, 24 in order to trap metallic particles generated during the operation. In this example, the magnets 22, 24 are mounted inside the bore of the nut 16.

The rollers 20 are identical to each other and are distributed regularly around the screw 12. Each roller 20 extends along an axis 20a which is coaxial with the axis 12a of the screw and comprises an outer thread 26 engaging the thread 14 of the screw and the thread 18 of the nut. Each roller 20 also comprises, at each axial end, outer gear teeth 28, 30 extended axially outwards the outer thread 26. The outer gear teeth 28, 30 are themselves extended axially by a cylindrical stud 32, 34 extending outwards. Each gear teeth 28, 30 are axially located between the associated stud 32, 34 and the outer thread 26. The outer thread 26 of each roller is axially located between the two gear teeth 28, 30.

The roller screw mechanism 10 also comprises two annular gear wheels 36, 38 fixed in a non-threaded part of the bore of the nut 16. Each gear wheel comprises inner gear teeth 40, 42 meshing the gear teeth 28, 30 respectively of the rollers 20 for the synchronization thereof. Each gear wheel 36, 38 axially bears against a radial surface of the nut 16 provided between the inner thread 18 and the associated non-threaded part of said nut. The gear wheels 36, 38 are identical to one another. The gear wheels 36, 38 and the rollers 20 are entirely housed into the nut 16, i.e. they do not axially protrude outwards relative to the nut. In the disclosed embodiment, the mechanism 10 comprises two gear wheels 36, 38. Alternatively, the gear teeth 40, 42 may be formed directly on the nut 16. In this case, the mechanism 60 is deprived of gear wheels.

The mechanism 10 further comprises two annular guides or spacer rings 44, 46 each mounted radially between the screw 12 and the associated gear wheel 36, 38. Each spacer ring 44, 46 is mounted in the bore of the associated gear wheel 36, 38 and is freely moveable in the circumferential direction with respect to said gear wheel. Each ring 44, 46 comprises a plurality of cylindrical through-recesses (not referenced) which are distributed regularly in the circumferential direction and inside which the studs 32, 34 of the rollers are housed. The spacer rings 44, 46 enable the rollers 20 to be carried and the regular circumferential spacing thereof to be kept. The mechanism 10 further comprises elastic retainer rings (not referenced) each mounted in a groove formed in the bore of the associated gear wheel and adapted to axially hold the corresponding spacer ring 44, 46.

As previously mentioned, the magnets 22, 24 are mounted inside the mechanism 10. Here, the magnets 22, 24 are mounted in the non-threaded part of said bore. The magnets 22, 24 are secured to the nut 16. The magnets 22, 24 are radially located between said non-threaded part and the rollers 20. In the disclosed example, each magnet 22, 24 radially surrounds the gear teeth 28, 30 of the rollers. The magnet 22 is axially located between the inner thread 18 of the nut and the synchronization gear teeth 40. The magnet 24 is axially located between said inner thread 18 and the other gear teeth 42. Each magnet 22, 24 is mounted adjacent to the associated gear teeth 40, 42. In the disclosed example, each magnet 22, 24 axially abuts against the associated gear wheel 36, 38. In the disclosed example, each magnet 22, 24 is fitted inside an annular groove 64a, 64b formed in the bore of the nut. Each magnet 22, 24 is radially offset outwards with respect to the adjacent gear teeth 40, 42. In the disclosed example, the magnets 22, 24 are identical to each other. For example, each magnet material may be neodymium, alnico, strontium ferrite, etc.

Figure 2:
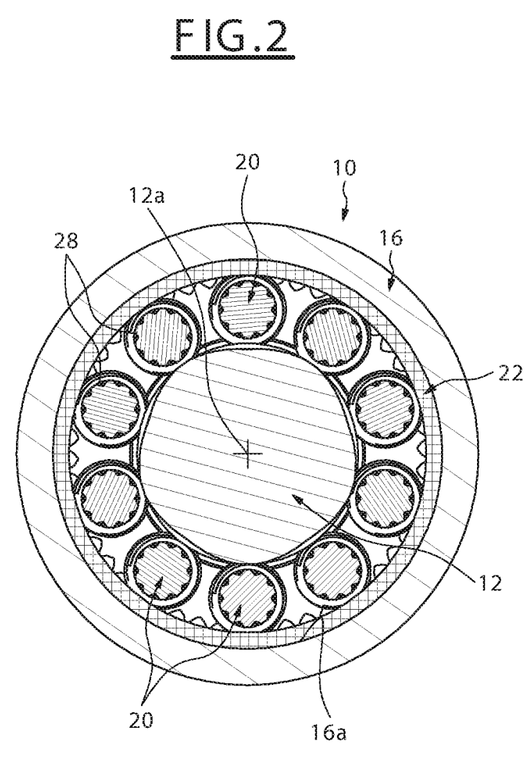
FIG. 2 is a section on II-II of FIG. 1.

As shown on FIG. 2, the magnet 22 is made in one part and has an annular form centred on the axis 12a of said screw. Alternatively, the magnet 22 may comprise two identical C-shaped magnetized parts which are disposed on the screw to obtain a magnet having an annular form. In another variant, the magnet 22 may comprise a plurality of magnetized parts regularly spaced apart in the circumferential direction.

Referring once again to FIG. 1, during the running-in phase of the mechanism 10, contacts between the synchronization gear teeth 40, 42 and the gear teeth 28, 30 of the rollers generate metallic particles due to sharp edges. Such generation of particles also exists after the running-in phase.

Since the magnets 22, 24 are disposed proximate the gear teeth 40 and 42, the metallic particles are generated near to said magnets. The particles are thus attracted and trapped by the magnetic field emitted by the magnets 22, 24 as soon as they are produced. Accordingly, the generated metallic particles are caught by the magnets 22, 24 before to be spread and mixed with the lubricant (not shown) passing through the mechanism 10. The attractive force of each magnet 22, 24 is chosen in order that the flow of lubricant inside the assembly 10 is insufficient to dislodge particles from said magnets.

Otherwise, the wear of the outer threads 26 of the rollers and the threads 14, 18 of the screw and nut also cause metal particles to be broken away. These particles are carried by the flow of lubricant which passes through the mechanism 10 and which is oriented towards the magnet 22, or the magnet 24, according to the direction of rotation of the screw 12. By the screw effect, the metallic particles carried by the lubricant pass proximate the magnet 22, or 24, and are thus trapped. The action of the magnets 22, 24 increases lubricant life, reduces the wear and consequently increases the lifetime of the roller screw mechanism 10.

Figure 3:
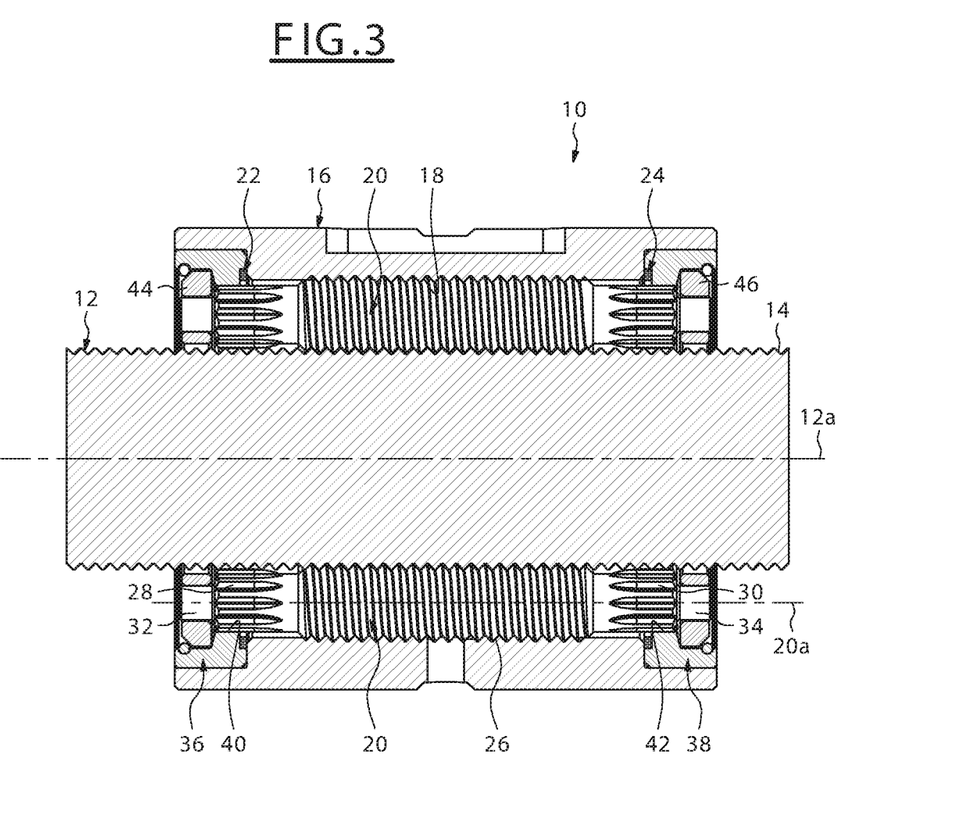
FIG. 3 is a cross-section of a roller screw mechanism according to a second example of the invention.

The example illustrated on FIG. 3, in which identical parts are given identical references, differs from the first example in that each magnet 22, 24 is mounted in a groove (not referenced) formed in the bore of the associated gear wheel 36, 38. Each magnet 22, 24 is secured to the associated gear wheel. The magnets 22, 24 are radially located between the associated gear wheel 36, 38 and the rollers 20. Each magnet 22, 24 is radially offset outwards with respect to the adjacent gear teeth 40, 42. The magnet 22, 24 is axially located between the associated gear wheel 36, 38 and the radial surface of the nut 16 which is provided between the inner thread 18 and the non-threaded part of said nut. Each magnet 22, 24 is disposed proximate the associated gear teeth 40, 42. In another variant, it could be possible to provide the magnets on the spacer rings 44, 46.

In the first and second illustrated examples, the invention has been illustrated on the basis of a planetary roller screw mechanism. The example illustrated on FIG. 4, in which identical parts are given identical references, differs in that the mechanism 10 is of the inverted roller screw type.

Figure 4:
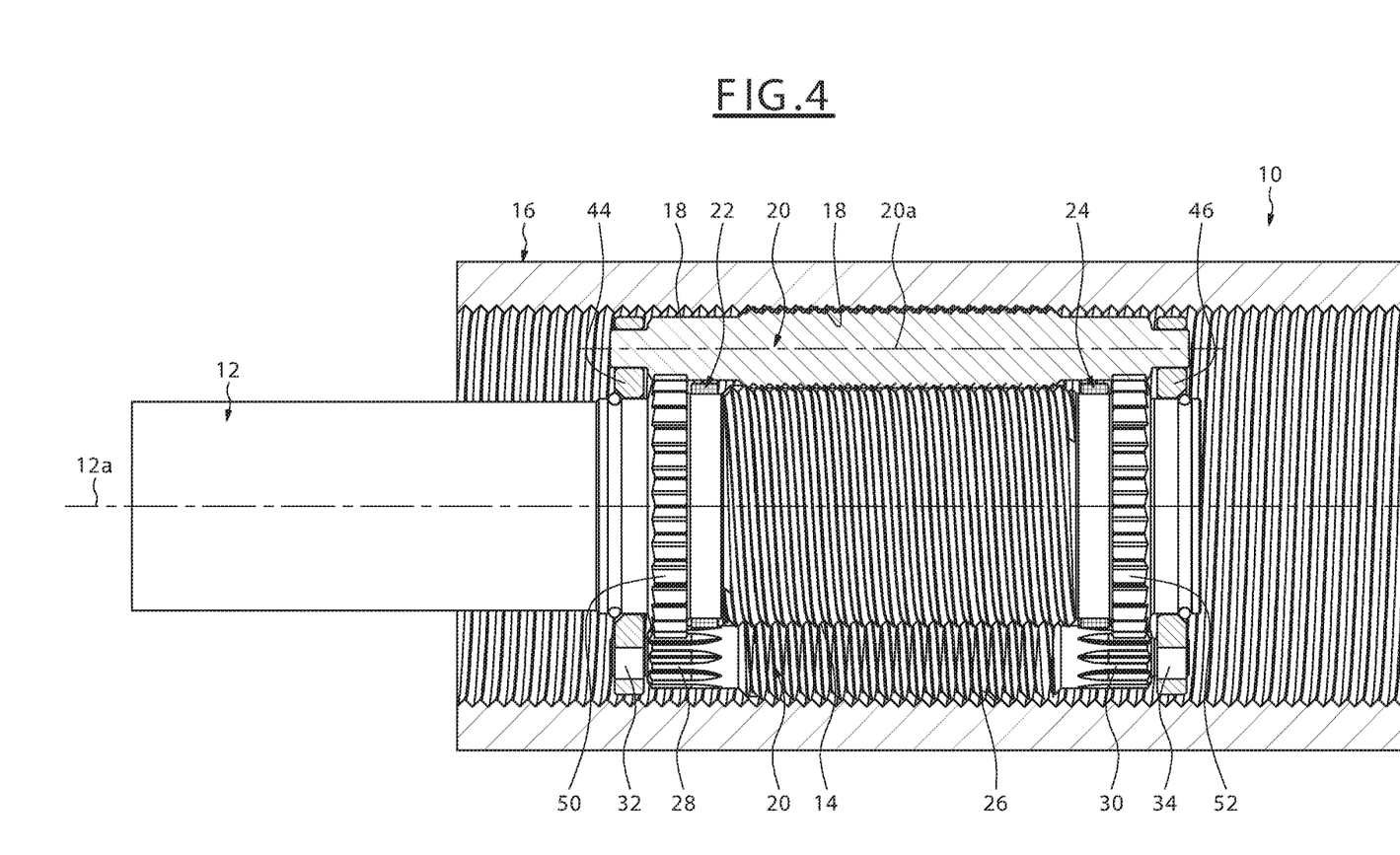
FIG. 4 is a cross-section of a roller screw mechanism according to a third example of the invention.

The screw 12 is provided with two outer synchronization gear teeth 50, 52 meshing the gear teeth 28, 30 respectively of the rollers 20. The gear teeth 50, 52 are formed on the outer surface of the screw 12. The gear teeth 50, 52 are identical to one another and axially disposed on either side of the outer thread 14. In the illustrated example, the gear teeth 50, 52 are formed directly on the screw 12. Alternatively, it could be possible to foresee annular gear wheels fixed on the outer surface of the screw 12 and each comprising synchronization gear teeth. In this example, the spacer rings 44, 46 are each mounted radially between a non-threaded part of the outer surface of the screw 12 and the thread 18 of the nut.

In this example, the magnets 22, 24 are mounted on the screw 12. The magnets 22, 24 are mounted on the outer surface of the screw 28. The magnets 22, 24 are secured to the screw 28. The magnets 22, 24 are radially located between said outer surface and the rollers 20. The magnet 22 is axially located between the outer thread 14 of the screw and the synchronization gear teeth 50. The magnet 24 is axially located between said outer thread 14 and the other gear teeth 52. Each magnet 22, 24 is mounted adjacent to the associated gear teeth 50, 52. In the disclosed example, each magnet 22, 24 is fitted inside a groove (not referenced) formed on the outer surface of the screw 28. Each magnet 22, 24 is radially offset inwards with respect to the adjacent gear teeth 50, 52.

The previous illustrated examples deal with planetary roller screw mechanisms and an inverted roller screw mechanism. The invention can also be applied to a recirculating roller screw mechanism as shown on FIG. 5.

Figure 5:
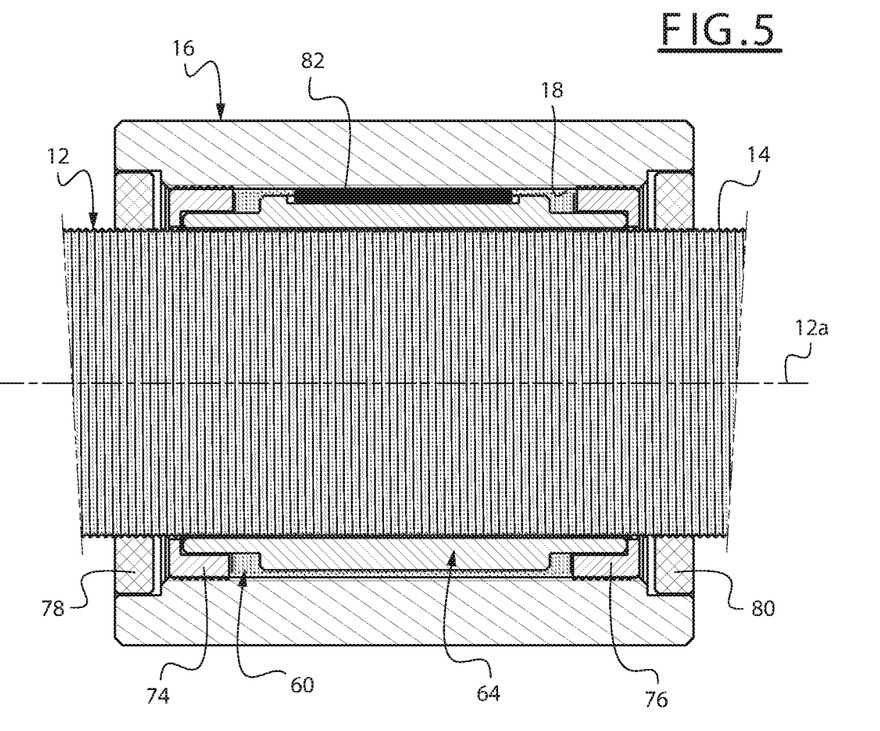
FIG. 5 is a cross-section of a roller screw mechanism according to a fourth example of the invention.

In this example, in which identical parts are given identical references, the mechanism 10 comprises a plurality of longitudinal grooved rollers 60 arranged radially between the screw 12 and the nut 16. The rollers 60 are identical to each other and are distributed regularly around the screw 12. Each roller 60 extends along an axis (not shown) which is coaxial with the axis 12a of the screw and comprises a plurality of outer grooves (not referenced) engaging the thread 14 of the screw and the thread 18 of the nut.

The mechanism 10 further comprises a retaining cage 64 for maintaining the rollers 60 circumferentially spaced apart. The rollers 60 are also axially maintained by the cage 64. The cage 64 is mounted radially between the screw 12 and the nut 16. The cage 22 is entirely housed inside the nut 16. As shown more clearly on FIG. 6, the cage 22 comprises a plurality of apertures or pockets 66 which are spaced apart one with another in the circumferential direction for receiving the rollers 60. The pockets 66 are identical to one another.

Figure 6:
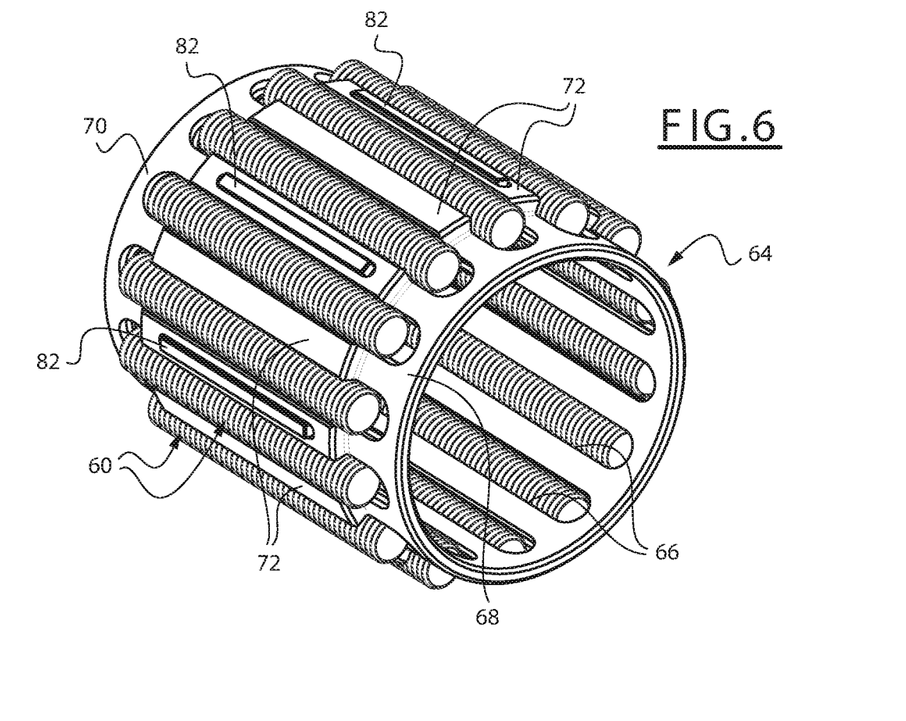
FIG. 6 is a perspective view of a cage with the associated rollers of the mechanism of FIG. 5.

The cage 22 comprises a first annular portion 68, a second annular portion 70 and a plurality of elongated fingers 72 extending axially between said portions. The fingers 72 are connected to the first and second annular portions 68, 70. In the illustrated example, the cage 64 is made in one part. The fingers 72 are spaced apart one with another in the circumferential direction. The annular portions 68, 70 delimit together with two adjacent fingers 72 one of the pockets 66. Each finger 66 is circumferentially located between two successive rollers 60. The length of the pockets 66 is greater than the rollers 20.

Referring once again to FIG. 5, the mechanism 10 also comprises two cams 74, 76 each fixed at one axial end of the thread 18 of the nut. To this end, the outer surface of each cam 74, 76 is provided with a thread meshing the thread 18. Each axial end of the cage 64 is centred into the bore of the associated cam 74, 76. The cams 74, 76 are identical to one another. The cams 74, 76 are provided in order to enable each roller 60 to return to its initial position after a complete revolution.

The mechanism 10 further comprises two wipers 78, 80 fixed in a non-threaded part of the bore of the nut 16. Each wiper 78, 80 axially bears against the radial surface of the nut 16 provided between the inner thread 18 and the associated non-threaded part of said nut. The cams 74, 76 and the cage 64 are axially located between the wipers 78, 80. The wipers 78, 80 are identical to one another.

The mechanism 10 further comprises a plurality of magnetized magnets 82 in order to trap metallic particles generated during the operation, for example with the wear of the rollers and the threads 14, 18 of the screw and nut. In this example, the magnets 82 are mounted on the cage 64. The magnets 82 are secured to the cage 64. The magnets 82 extend radially towards the thread 18 of the nut while remaining distant from said thread. In the disclosed example, each magnet 82 is mounted on one of the fingers 72 of the cage and radially faces the thread 18 of the nut. Each magnet 82 is fitted inside a groove formed on the associated finger 72. In the disclosed example, the magnets 82 are identical to each other and each have a rectangular form. For example, each magnet material may be neodymium, alnico, strontium ferrite, etc.

Figure 7:
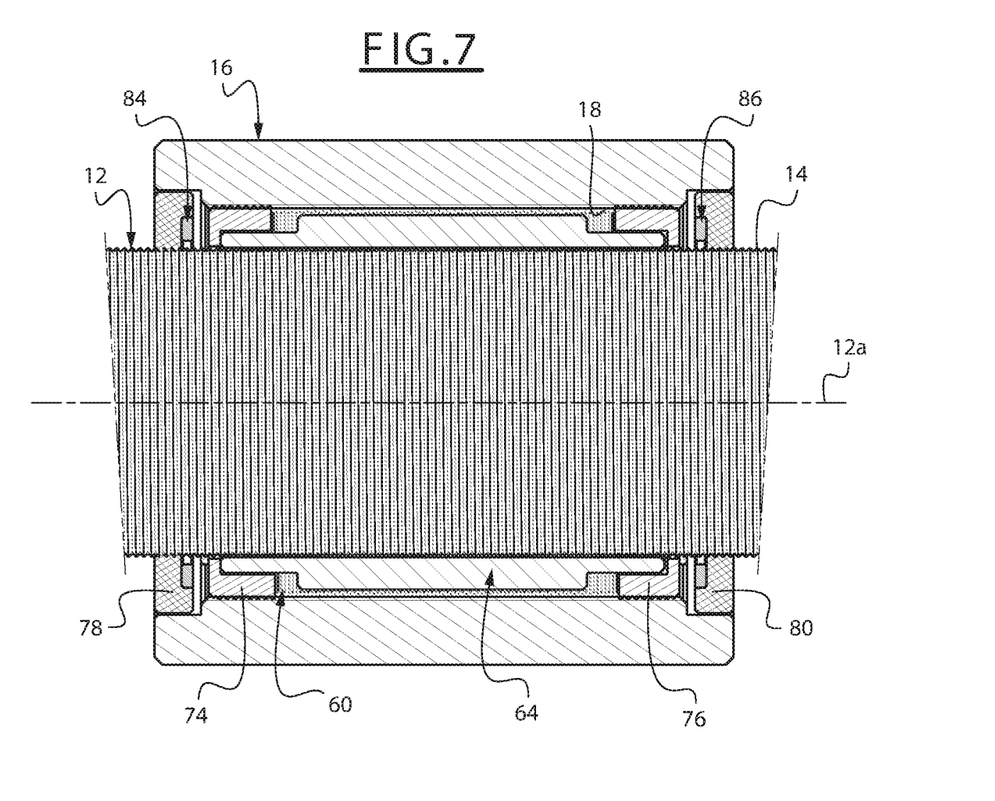
FIG. 7 is a cross-section of a roller screw mechanism according to a fifth example of the invention.

The example shown on FIG. 7, in which identical parts are given identical references, only differs from the previous example in that the mechanism 10 comprises two magnets 84, 86 each mounted on one of the wipers 78, 80. Each magnet 84, 86 is mounted in a groove (not referenced) formed in the bore of the associated wiper 78, 80. Each magnet 84, 86 is secured to the associated wiper. Each magnet 84, 86 is axially offset towards the outside with respect to the rollers 60. Each magnet 84, 86 is axially located between the associated wiper 78, 80 and the facing cam 74, 76. The magnets 84, 86 are radially located between the wipers 78, 80 and the screw 12.

The integration of magnetized means into the roller screw mechanism enables to catch metallic particles generated during the running-in phase of the mechanism or by wear. The action of the magnetic means consequently increases the lifetime of the mechanism.

The invention claimed is:

1. A roller screw mechanism comprising:
   a screw having an outer thread;
   a nut surrounding and coaxial with the screw, the nut being provided with an inner thread;
   a plurality of rollers radially disposed between the screw and the nut and cooperating with the outer and inner threads; and
   magnetized means for attracting metal particles are disposed inside the roller screw mechanism radially between the screw and the nut.

2. The roller mechanism according to claim 1, wherein the rollers are each provided with an outer thread engaging the outer and inner threads and with two outer gear teeth, the mechanism further comprising two synchronization gear teeth provided on the nut, or the screw, and meshing with the gear teeth of the rollers.

3. The roller mechanism according to claim 2, wherein the magnetized means are disposed adjacent to at least one of the synchronization gear teeth.

4. The roller mechanism according to claim 2, wherein the magnetized means are connected to the nut and located axially between the inner thread of the nut and one of the synchronization gear teeth.

5. The roller mechanism according to claim 4, wherein the magnetized means are secured to the nut or to at least one of gear wheels of the mechanism that are provided with the synchronization gear teeth.

6. The roller mechanism according to claim 2, wherein the magnetized means are secured to the outer surface of the screw and located axially between the outer thread of the screw and one of the synchronization gear teeth.

7. The roller mechanism according to claim 2, comprising at least two magnetized means disposed adjacent to the associated synchronization gear teeth.

8. The roller mechanism according to claim 1, wherein the rollers are each provided with outer grooves engaging the outer and inner threads, the mechanism further comprising one retaining cage having a plurality of pockets spaced apart one with another in the circumferential direction, and wherein the rollers are disposed within the pockets.

9. The roller mechanism according to claim 8, wherein the magnetized means are secured to the retaining cage.

10. The roller mechanism according to claim 8, further comprising wipers mounted into a bore of the nut, the magnetized means being disposed at least on one of the wipers.

* * * * *